US009586495B2

(12) United States Patent
Kanzaki et al.

(10) Patent No.: US 9,586,495 B2
(45) Date of Patent: Mar. 7, 2017

(54) AUTOMOTIVE VEHICLE

(71) Applicant: Toyota Jidosha Kabushiki Kaisha, Toyota-shi, Aichi-ken (JP)

(72) Inventors: Takao Kanzaki, Miyoshi (JP); Tomoo Yamabuki, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 364 days.

(21) Appl. No.: 14/222,135

(22) Filed: Mar. 21, 2014

(65) Prior Publication Data

US 2014/0285210 A1 Sep. 25, 2014

(30) Foreign Application Priority Data

Mar. 25, 2013 (JP) ................................ 2013-061934

(51) Int. Cl.
| | | |
|---|---|---|
| B60L 11/18 | (2006.01) | |
| B60L 3/04 | (2006.01) | |
| B60L 3/12 | (2006.01) | |

(52) U.S. Cl.
CPC ............. B60L 11/1851 (2013.01); B60L 3/04 (2013.01); B60L 3/12 (2013.01); Y02T 10/7005 (2013.01); Y02T 10/705 (2013.01); Y02T 10/7258 (2013.01)

(58) Field of Classification Search
CPC .......... B60L 11/1851; B60L 3/12; B60L 3/04; Y02T 10/7258; Y02T 10/705; Y02T 10/7005

See application file for complete search history.

(56) References Cited

U.S. PATENT DOCUMENTS

| | | | | |
|---|---|---|---|---|
| 2002/0057582 | A1* | 5/2002 | Nakayama | B60K 6/445 363/17 |
| 2007/0247106 | A1* | 10/2007 | Kawahara | B60L 3/0046 320/104 |
| 2009/0108674 | A1* | 4/2009 | Ozaki | B60L 3/0046 307/10.6 |
| 2010/0085060 | A1* | 4/2010 | Ichikawa | G01R 31/3277 324/503 |

(Continued)

FOREIGN PATENT DOCUMENTS

| | | |
|---|---|---|
| CN | 102859857 A | 1/2013 |
| JP | 2003-088144 A | 3/2003 |

(Continued)

OTHER PUBLICATIONS

Harada et al JP 2008206313, "Smoothing Capacitor Discharge for Vehicular Power Converter", English Machine Translation, Published Sep. 4, 2008.*

*Primary Examiner* — Melissa Koval
*Assistant Examiner* — Felicia Farrow
(74) *Attorney, Agent, or Firm* — Dinsmore & Shohl LLP

(57) ABSTRACT

After turning on a switching element by receiving a discharge command from a motor ECU via a control circuit, a drive circuit of a discharge device causes, upon receipt of an overheat protection command from an overheat protection circuit, the switching element to turn off and keeps the resulting state thereof. And, the motor ECU sends the discharge command, after establishment of a diagnostic condition, to the control circuit of the discharge device and determines that the discharge device is abnormal if an electric current will not flow through a discharge resistor and the switching element.

5 Claims, 7 Drawing Sheets

(56) References Cited

U.S. PATENT DOCUMENTS

| | | | |
|---|---|---|---|
| 2010/0134069 A1* | 6/2010 | Oosawa | H02J 7/0021 |
| | | | 320/118 |
| 2011/0031939 A1* | 2/2011 | Funaba | B60K 6/445 |
| | | | 320/166 |
| 2012/0098470 A1 | 4/2012 | Itou | |
| 2012/0176117 A1* | 7/2012 | Watanabe | H03K 17/0822 |
| | | | 323/312 |
| 2013/0033914 A1 | 2/2013 | Yahata et al. | |
| 2014/0191693 A1* | 7/2014 | Funaba | H02J 7/0036 |
| | | | 318/139 |

FOREIGN PATENT DOCUMENTS

| | | |
|---|---|---|
| JP | 2005-020952 A | 1/2005 |
| JP | 2009-189153 A | 8/2009 |
| JP | 2011-234507 A | 11/2011 |
| JP | 2012-095427 A | 5/2012 |
| JP | 2013-090424 A | 5/2013 |
| WO | 2013057571 A1 | 4/2013 |

\* cited by examiner

AUTOMOTIVE VEHICLE

INCORPORATION BY REFERENCE

The disclosure of Japanese Patent Application No. 2013-061934 filed on Mar. 25, 2013 including the specification, drawings and abstract is incorporated herein by reference in its entirety.

BACKGROUND OF THE INVENTION

1. Field of the Invention

The present invention is directed to an automotive vehicle.

2. Description of Related Art

An automotive vehicle has been proposed that include a motor generator, an inverter circuit that serves to drive the motor generator, a battery that exchanges electric power to the motor generator via the inverter circuit, a system main relay for interrupting a connection between the inverter circuit and the battery, and a discharge resistor and a high-voltage capacitor both of which are connected in parallel between positive and negative electrode buses of a power line provided between the inverter circuit and the system main relay, in which upon prediction of a vehicle collision the system main relay is turned off and an accumulated charge in the high-voltage capacitor is discharged by controlling the inverter circuit for prevention of a generation of torque in the motor generator (see, for example, Japanese Patent Application Publication No. 2005-20952 (JP 2005-20952 A)).

In such an automotive vehicle, ideas have been proposed which include providing a discharge device that is separated from the inverter circuit in order to discharge the charge accumulated in the high-voltage capacitor upon prediction of a vehicle collision or other situation, and for simplifying an overall structure, connecting a motor control device for controlling the motor generator and the discharge device such that a signal can be sent only from the motor control device to the discharge device. Such a configuration may issue a problem in which the motor control device fails to detect an abnormal condition of the discharge device due to the fact that when the discharge device becomes abnormal no signal cannot be transmitted from the discharge device to the motor control device.

SUMMARY OF THE INVENTION

The present invention provides an automotive vehicle in which a motor control device that controls a motor can detect an abnormal condition of a discharge device provided in a power line connecting an inverter that drives the motor and a battery.

An automotive vehicle according to a first aspect of the present invention includes a motor for travelling; a battery; a discharge device having a discharge portion in which a switching element and a discharge resistor are provided which are connected in series to positive and negative electrode buses of a power line that connects the inverter that drives the motor and the battery, and a driving circuit causing the switching element to turn selectively on and off, and an overheat protection portion outputting an OFF command to the discharge portion for turning off the switching element while determining an overheat condition of the discharge resistor; and a motor control device controlling the motor and outputting an ON command to the discharge portion for turning on the switching element when a specified condition is established that includes a diagnostic condition of the discharge device. The discharge portion is configured to, after turning on the switching element by receiving the ON command that indicate to turn on the switching element from the motor control device and subsequently turning off the switching element by receiving the OFF command that indicates to turn off the switching element from the overheat protection portion, cause the switching element to remain turned off regardless of the signal from the motor control device. As establishment of the diagnostic condition, the motor control device is configured to output the ON command that indicates to turn on the switching element to the discharge portion and to determine whether the discharge device is normal or abnormal based on whether an electric current flows or not through the discharge resistor.

In the automotive vehicle according to the first aspect of the present invention, the discharge portion of the discharge device is configured to, after turning on the switching element by receiving the ON command that indicate to turn on the switching element from the motor control device and subsequently turning off the switching element by receiving the OFF command that indicates to turn off the switching element from the overheat protection portion, cause the switching element to remain turned off regardless of the command from the motor control device. And, upon establishment of the diagnostic condition, the motor control device outputs the ON command that indicates to turn on the switching element to the discharge portion and to determine whether the discharge device is normal or abnormal based on whether an electric current flows or not through the discharge resistor. In this configuration, it is possible to regard, for example, "when an ignition key is turned off" as "upon establishment of the diagnostic condition". In addition, as "upon establishment of the specified condition", other than "upon establishment of the diagnostic condition", for example, it is possible to employ "when a relay is turned off by detecting or predicting a vehicle collision, the relay being provided closer to the battery in the power line near to the battery in the power line from the discharge device and the capacitor connected in parallel in the power line. Though, during a normal vehicle travel, the ON command that indicates to turn on the switching element is not transmitted from the motor control device to the discharge device, when, for example, noise is mixed in a connecting line (signal line) between the motor control device and the discharge device, the discharge device may cause the switching element to turn on. In the automotive vehicle according to the first aspect of the present invention, even if the discharge device turns on or off prior to the establishment of the diagnostic condition, the switching element remain turned off and thereafter when the diagnostic condition is established the motor control device outputs the ON command to the discharge device that indicates to turn on the switching element, which results in that the electric current does not flow through the discharge resistor. Thus, determining at this time whether an electric current flows through the discharge resistor makes it possible to determine that the discharge device is in an abnormal condition if the discharge device begins to operate prior to an establishment of the diagnostic condition. In addition, in the automotive vehicle according to the first aspect of the present invention, after the discharge portion causes the switching element to turn on by receiving the ON command from the motor control device that indicates to turn on the switching element, when the discharge device causes the switching element to turn off by receiving the OFF command from the overheat protection portion that indicates to turn off the switching element, thereafter, it is possible to avoid a repeatedly turning on and off of the switching element.

In the automotive vehicle according to the first aspect of the present invention, the motor control device may be configured to determine whether the discharge device is normal or abnormal based on an ON-continuation time duration between a time instant when the electric current flows through the discharge resistor which is caused by outputting the ON command that indicates to turn on the switching element after establishment of the diagnostic condition and a time instant when the discharge portion causes the switching element to turn off by the OFF command from the overheat protection portion that indicates to turn off the switching element.

In the automotive vehicle according to the first aspect of the present invention in which the motor control device has a determination mode that determines whether the discharge device is normal or abnormal based on the ON-continuation time duration, the motor control device may be configured to determine that the discharge device is normal when the ON-continuation time duration is equal to or longer than a first predetermined time duration and is equal to or shorter than a second predetermined time duration that is longer than the first predetermined time duration, to determine that a resistive value of the discharge resistor of the discharge device is abnormal when the ON-continuation time duration is less than the first predetermined time duration, and to determine that the resistive value of the discharge resistor or the overheat protection portion of the discharge device is abnormal when the ON-continuation time duration is longer than the second predetermined time duration.

An automotive vehicle according to a second aspect of the present invention includes a motor for travelling; a battery; a discharge device having a discharge portion in which are provided a discharge resistor and a switching element connected in series to positive and negative electrode buses of a power line that connects the inverter that drives the motor and the battery, and a driving circuit causing the switching element to turn selectively on and off, and an overheat protection portion outputting an OFF command to the discharge portion that indicates to turn off the switching element continually from a determination of an overheat condition of the discharge resistor until a determination that the overheat condition is released; and a motor control device controlling the motor and outputting an ON command to the discharge portion that indicates to turn on the switching element when a specified condition is established that includes a diagnostic condition. The discharge portion is configured to turn on the switching element upon receipt of the ON command that indicates to turn on the switching element from the motor control device and subsequently to turn off the switching element upon receipt of the OFF command that indicates to turn off the switching element from the overheat protection portion. The motor control device is configured to determine whether the discharge device is normal or abnormal based on an ON-continuation time duration between a time instant when the ON command for turning on the switching element is outputted to the discharge portion after establishment of the diagnostic condition and a time instant when the discharge portion causes the switching element to turn off by the OFF command from the overheat protection portion that indicates to turn off the switching element.

In the automotive vehicle according to the second aspect of the present invention, the discharge portion of the discharge device is configured to turn on the switching element upon receipt of the ON command that indicates to turn on the switching element from the motor control device and subsequently turn off the switching element upon receipt of the OFF command that indicates to turn off the switching element from the overheat protection portion. And, upon establishment of the diagnostic condition, the motor control device determines whether the discharge device is normal or abnormal based on an ON-continuation time duration between a time instant of outputting the ON command that indicates to turn on the switching element and a time instant when the discharge portion causes the switching element to turn off by the OFF command that indicates to turn off the switching element from the overheat protection portion. In this configuration, it is possible to regard, for example, "when an ignition key is turned off" as "upon establishment of the diagnostic condition". In addition, as "upon establishment of the specified condition", other than "upon establishment of the diagnostic condition", for example, it is possible to employ "when a relay is turned off by detecting or predicting a vehicle collision, the relay being provided closer to the battery in the power line near to the battery in the power line from the discharge device and the capacitor connected in parallel in the power line. In the automotive vehicle according to the second aspect of the present invention, the discharge portion, upon receipt of the ON command from the motor control device that indicates to turn on the switching element, causes the switching element to turn on and thereafter causes the switching element to turn off upon receipt of the OFF command from the overheat protection portion that indicates to turn off the switching element when the discharge resistor overheats, thereby making it possible to diagnose whether the discharge device is normal or abnormal by using the ON-continuation time duration.

In the automotive vehicle, which is thus configured, according to the second aspect of the present invention, the motor control device may be configured to determine whether the discharge device is normal or abnormal based on the ON-continuation time duration, to determine that the discharge device is normal when the ON-continuation time duration is equal to or longer than a first predetermined time duration and is equal to or shorter than a second predetermined time duration that is longer than the first predetermined time duration, to determine that a resistive value of the discharge resistor of the discharge device is abnormal when the ON-continuation time duration is less than the first predetermined time duration, and to determine that the resistive value of the discharge resistor or the overheat protection portion of the discharge device is abnormal when the ON-continuation time duration is longer than the second predetermined time duration.

The automotive vehicle according to the first aspect or the second aspect of the present invention may be configured to further include an engine, a generator, and a planetary gear whose three rotating elements are connected to a drive shaft connected to an axle, an output shaft of the engine, and a rotation shaft of the generator, respectively, in which the motor is configured such that a rotor of the motor is connected to the drive shaft.

BRIEF DESCRIPTION OF THE DRAWINGS

Features, advantages, and technical and industrial significance of exemplary embodiments of the invention will be described below with reference to the accompanying drawings, in which like numerals denote like elements, and in which.

DETAILED DESCRIPTION OF EMBODIMENTS

Next, modes for carrying out the present invention will be described in term of embodiments.

Figure 1:
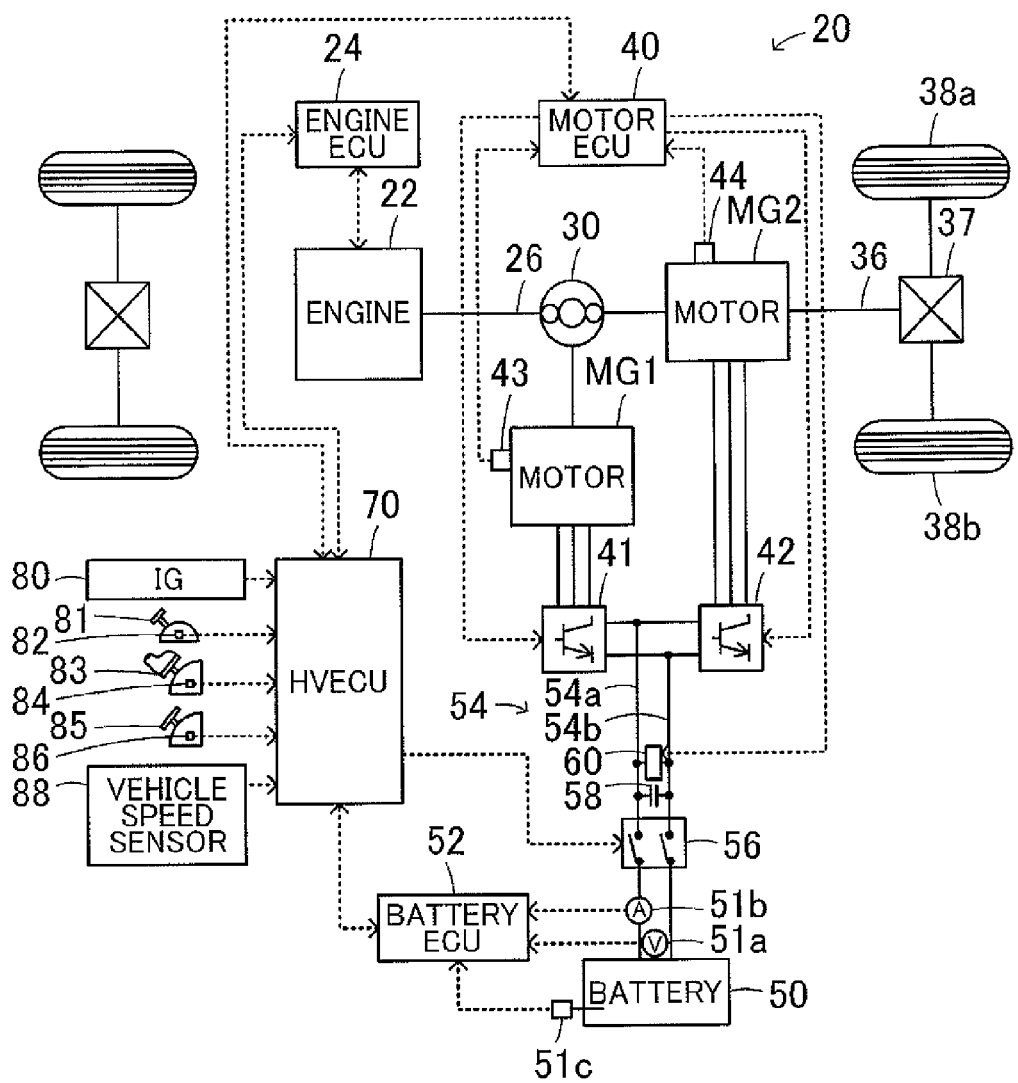
FIG. 1 is a schematic block diagram of an outline structure of a hybrid automotive vehicle 20 according to an embodiment of the present invention.
Figure 2:
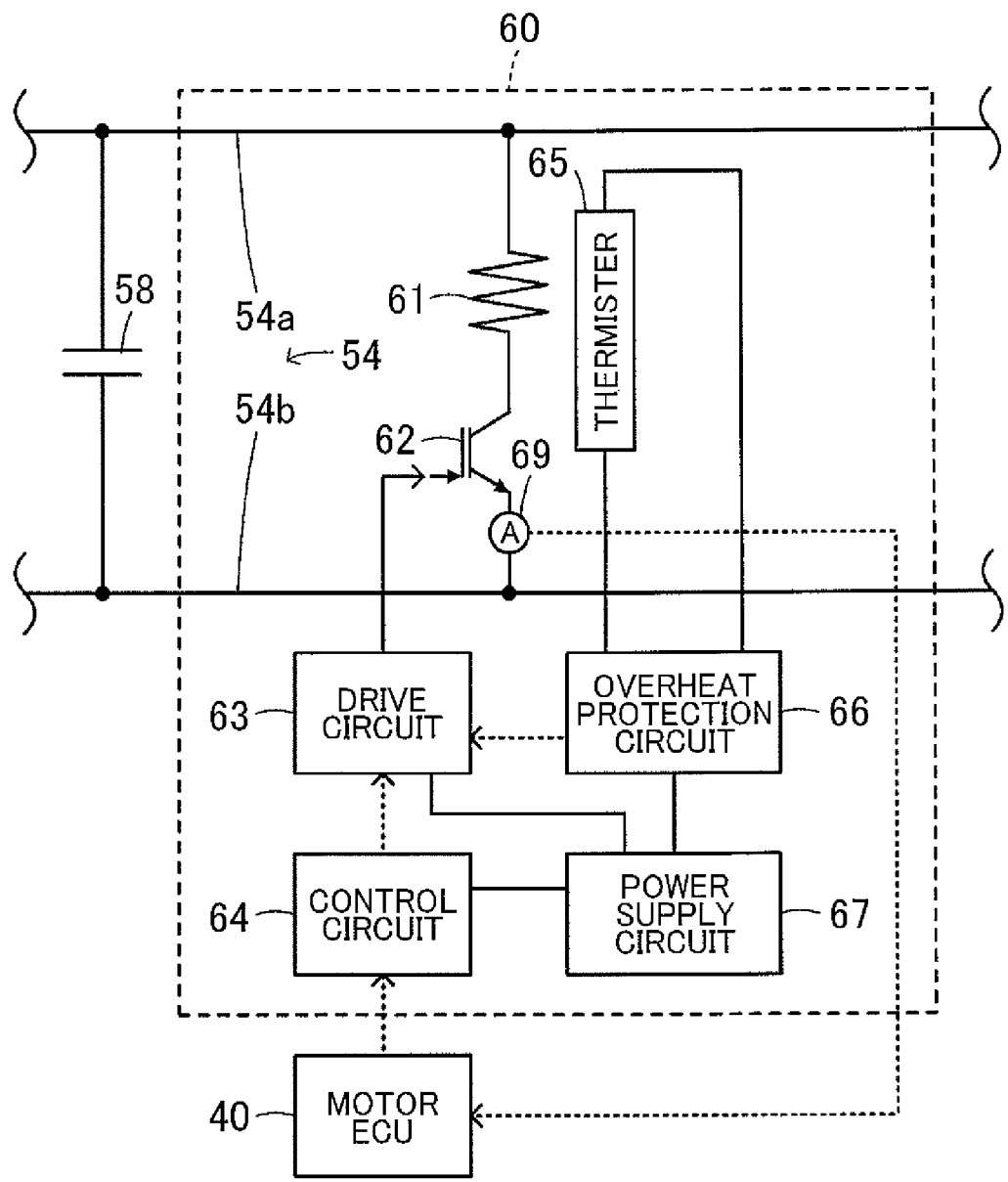
FIG. 2 is a schematic block diagram of a discharge device 60.

FIG. 1 is a schematic block diagram of an outline structure of a hybrid automotive vehicle 20 as an embodiment of the present invention and FIG. 2 is a schematic block diagram of an outline structure of a discharge device 60. The hybrid automotive vehicle 20 of the embodiment includes, as illustrated in FIG. 1, an engine 22 that delivers power using gasoline or light oil as fuel, an electronic control unit 24 (hereinafter referred to as engine ECU) that controls drive of the engine 22, a planetary gear 30 whose carrier is connected to a crankshaft 26 of the engine 22 and whose ring gear is connected to a drive shaft 36 that is connected via a differential gear 37 to driving wheels 38a and 38b, a motor MG1 which is configured as, for example, a synchronous generation electric motor and whose rotor is connected to a sun gear of the planetary gear 30, a motor MG2 which is configured as, for example, a synchronous generation electric motor and whose rotor is connected to the drive shaft 36, inverters 41 and 42 which serves for driving the motors MG1 and MG2, an electronic control unit (hereinafter referred to as motor ECU) 40 that drivingly controls the motors MG1 and MG2 by performing switching control of switching elements (not shown) of the respective inverters 41 and 42, a battery 50 that is in the form of, for example, a lithium-ion secondary battery, an electronic control unit (hereinafter referred to as battery ECU) 52 that manages the battery 50, a system main relay 56 that selectively establishes and interrupts a connection between each of the inverters 41 and 42 and the battery 50, a capacitor 58 that is connected between a positive electrode bus 54a and a negative electrode bus 54b of a power line 54 that is provided between each of the inverters 41 and 42 and the system main relay 56, a discharge device 60 that is connected between the positive electrode bus 54a and the negative electrode bus 54b of the power line 54, and a hybrid vehicle electronic control unit (hereinafter referred to as HVECU) 70 that serves for controlling a whole of the vehicle.

The engine ECU 24, though its components are not illustrated, is configured as a microprocessor whose core element is a CPU and includes a ROM storing processing programs, a RAM storing data temporally, input and output ports, and communication ports, other than the CPU. The engine ECU 24 is inputted, via the input ports, with signals which come from various sensors that detect operating conditions of the engine 22 and which include, for example, a crank position θcr outputted from a crank position sensor that detects a rotational position of the crankshaft 26, a cooling water temperature Tw outputted from a water temperature sensor that detects a temperature of a cooling water for the engine 22, an in-cylinder pressure Pin outputted from a pressure sensor provided in a combustion chamber, a cam position θca outputted from a cam position sensor that detects a rotational position of a cam shaft which opens and closes intake and exhaust valves for supplying air to and discharging exhaust gas from the combustion chamber, a throttle position TP outputted from a throttle valve position sensor that detects a position of a throttle valve, an intake air amount Qa outputted from an air flow meter provided in an intake tube, an intake air temperature Ta outputted from a temperature sensor provided in the same intake tube, an air/fuel ratio AF outputted from an air/fuel ratio sensor provided in an exhaust system, and an oxygen signal $O_2$ outputted from an oxygen sensor provided in the same exhaust system, while the engine ECU 24 outputs, via the output ports, various control signals for drivingly controlling the engine 22, which include, for example, a driving signal to be fed to a fuel injection valve, a driving signal to be fed to a throttle motor for adjustment of a throttle valve position, a control signal to be fed to an ignition coil integrated with an igniter, a control signal to be fed to a variable valve timing mechanism that is capable of adjusting an open/close timing of an intake valve. In addition, the engine ECU 24 is in communication with the HVECU 70 for drivingly controlling the engine 22 in response to a control signal from the HVECU 70 and outputs data sets regarding driving conditions of the engine 22 to the HVECU 70 as required. It is to be noted that the engine ECU 24 also calculates a rotational speed of the crankshaft 26 i.e., an engine speed of the engine 22 based on the signal from the crank position sensor (not shown) that is provided on the crankshaft 26.

The motor ECU 40, though its components are not illustrated, is configured as a microprocessor whose core element is a CPU and which includes a ROM storing processing programs, a RAM storing data temporally, input and output ports, and communication ports, other than the CPU. The motor ECU 40 is inputted, via the input ports, with signals required for drivingly controlling the motors MG1 and MG2. The signals include, for example, rotational positions θm1 and θm2 outputted from a rotational position detection sensors 43 and 44 that detects a rotational position of the rotor of the motors MG1 and MG2, respectively, phase currents applied to the motors MG1 and MG2 which are detected by current sensors (not shown), respectively, and a current Id outputted from a current sensor 69 (see FIG. 2) that is provided between the switching element 62 of the discharge device 60 and the negative electrode bus 54b of the power line 54. The motor ECU 40 outputs, via the output ports, signals which include, for example, switching control signals to switching elements (not shown) of the respective inverters 41 and 42. In addition, the motor ECU 40 is in communication with the HVECU 70 for drivingly controlling the motors MG1 and MG2 in response to respective control signals from the HVECU 70 and outputs data sets regarding driving conditions of the motors MG1 and MG2 to the HVECU 70 as required. It is to be noted that the motor ECU 40 also calculates rotational angular speeds ωm1 and ωm2 of the respective motors MG1 and MG2 and rotational speeds Nm1 and Nm2 of the respective motors MG1 and MG2 based on the rotational positions θm1 and θm2, which come from the respective rotational position detection sensors 43 and 44, of the respective motors MG1 and MG2.

The battery ECU 52, though its components are not illustrated, is configured as a microprocessor whose core element is a CPU and includes a ROM storing processing programs, a RAM storing data temporally, input and output ports, and communication ports, other than the CPU. The battery ECU 52 is inputted with signals required for managing the battery 50, the signals including, for example, a voltage Vb across terminals of the battery 50 which comes from a voltage sensor 51a provided thereacross, a charge and discharge current Ib outputted from a current sensor 51b provided in the power line connected to an output terminal of the battery 50, and a battery temperature Tb outputted from a temperature sensor 51c provided to the battery 50, while the battery ECU 52 outputs data sets regarding the conditions of the battery 50 to the HVECU 70 as required. In addition, the battery ECU 52 also calculates, for managing the battery 50, a power accumulation ratio SOC that is the ratio of a dischargeable electric energy to a whole electric energy from the battery 50 for every prescribed time based on a value that is obtained by integrating the charge and discharge current Ib outputted from the current sensor 51b and calculates an input limitation Win and an output limitation Wout of the battery 50 which are permitted maximum charge electric energy and discharge electric energy based on the calculated power accumulation ration SOC and the battery temperature Tb. It is to be noted setting the input limitation Win and the output limitation Wout of the battery 50 may be made by multiplying basic values, which are prepared for the input limitation Win and the output limitation Wout on the basis of the battery temperature Tb, by correction coefficients for output and input limitations on the basis of power accumulation ration SOC of the battery 50.

The discharge device 60 includes, as illustrated in FIG. 2, a discharge resistor 61 connected at one end thereof to the positive electrode bus 54a of the power line 54, a switching element 62 connected to the other end of the discharge resistor 61 and the negative electrode bus 54b of the power line 54, a drive circuit 63 that controls the switching element 62 to selectively turn on and off, a control circuit 64 that send a command for an on-off control of the switching element 62 to the drive circuit 63, a thermistor 65 provided near the discharge resistor 61, an overheat protection circuit 66 that is brought into operation (i.e., that sends an overheat protection command or an OFF command which indicates to turn off the switching element 62 to the drive circuit 63) while determining an overheat of the discharge resistor 61 on the basis of the signal from the thermistor 65, and a power supply circuit 67 that serves as power source for the drive circuit 63, the control circuit 64, and the overheat protection circuit 66.

In this configuration, the control circuit 64 is made to be able to receive signals from the motor ECU 40. Upon receipt of a discharge command (i.e., an ON command that indicates to turn on the switching element 62) from the motor ECU 40, the control circuit 64 sends this command to the drive circuit 63 and then sends, upon receipt of a discharge termination command (i.e., an OFF command that indicates to turn off the switching element 62) from the motor ECU 40, this command to the drive circuit 63. It is to be noted that for simplification of the configuration, the control circuit 64 is connected to the motor ECU 40 in such a manner that a signal transmission is allowed only from the motor ECU 40 to the control circuit 64.

The overheat protection circuit 66, upon determination of an overheat of the discharge resistor 61 by using the signal from the thermistor 65, is brought into operation (i.e., transmission of the overheat protection command to the drive circuit 63) that continues until the overheat of the discharge resistor 61 is eliminated (the temperature of the discharge resistor 61 is reduced).

In principle, the drive circuit 63 causes the switching element 64 to turn selectively on and off by order of the control circuit 64. And, during receipt of the overheat protection command from the overheat protection circuit 66, the drive circuit 63 causes the switching element 62 to turn off regardless of the command from the control circuit 64.

In this embodiment, taking into account of robustness, the power supply circuit 67 employs a system in which a voltage of the capacitor 58 is stepped down and the resulting voltage is supplied to the drive circuit 63, the control circuit 64, and the overheat protection circuit 66 and another system in which the charge (electric power) of the capacitor is supplied that is provided in a low-voltage system to which the power line 54 is connected via a DC/DC converter and to which a low voltage battery, auxiliary machines, and other equipment are connected. This will make it possible to discharge the capacitor 58 when, for example, an abnormal condition occurs in the low voltage system.

Incidentally, a set of the discharge resistor 61, the switching element 62, the drive circuit 63, the control circuit 64, and the power supply circuit 67 which are components of the embodiment corresponds to the "discharge portion" of the present invention, a set of the thermistor 65 and the overheat protection circuit 66 which are components of the embodiment corresponds to the "overheat protection portion" of the present invention, and the discharge device 60 which is a component of the embodiment corresponds to the "discharge device" of the present invention.

The HVECU 70, though its components are not illustrated, is configured as a microprocessor whose core element is a CPU and includes a ROM storing processing programs, a RAM storing data temporally, input and output ports, and communication ports, other than the CPU. The HVECU 70 is inputted, via the input ports, with signals which include, for example, an ignition signal from an ignition switch 80, a shift position SP from a shift position sensor 82 that detects an operation position of a shift lever 81, accelerator operation amount Acc from an accelerator pedal position sensor 84 that detects a depression amount of an accelerator pedal 83, a brake pedal position BP from a brake pedal position sensor 86 that detects a depression amount of a brake pedal 85, and a vehicle speed V from a vehicle speed sensor 88. The HVECU 70 outputs, via the output ports, signals which include, for example, an on-off signal to the system main relay 56. As described above, the HVECU 70 is in communication, via communication ports, with the engine ECU 24, the motor ECU 40, and the battery ECU 52 for swapping various control signals and data sets.

In the hybrid automotive vehicle 20 of the embodiment which is thus constructed, the engine 22, the motor MG1, and the motor MG2 are drivingly controlled to deliver a required power to the drive shaft 36, the required power being corresponded to a required torque Tr* to be outputted to the drive shaft 36 that is calculated based on the accelerator operation amount Acc corresponding to the depression amount of the accelerator pedal by a driver and the vehicle speed V. Modes for drivingly controlling the engine 22, the motor MG1, and the motor MG2 include, for example, a torque conversion driving mode, a charge/discharge driving mode, and a motor driving mode. In the torque conversion driving mode, the engine 22 is drivingly controlled for delivering a power that matches the required power and the motor MG1 and the motor MG2 are drivingly controlled such that all the power delivered from the engine 22 is brought into a torque conversion that is performed by the planetary gear 30, the motor MG1, and the motor MG2, and the resulting power is outputted to drive shaft 36. In the charge/discharge driving mode, the engine 22 is drivingly controlled to deliver a power that matches the sum of the required power and an electric power required for charging/discharging the battery 50 and the motor MG1 and the motor MG2 are drivingly controlled such that all or some of the power delivered from the engine 22 with the battery 50 charged/discharged is brought into a torque conversion that is performed by the planetary gear 30, the motor MG1, and the motor MG2, thereby outputting the resulting power to drive shaft 36. In the motor driving mode, while the engine 22 is held at rest, the engine 22 is drivingly controlled to deliver a power that matches the required power from the motor MG2 is outputted to the drive shaft 36.

Figure 3:
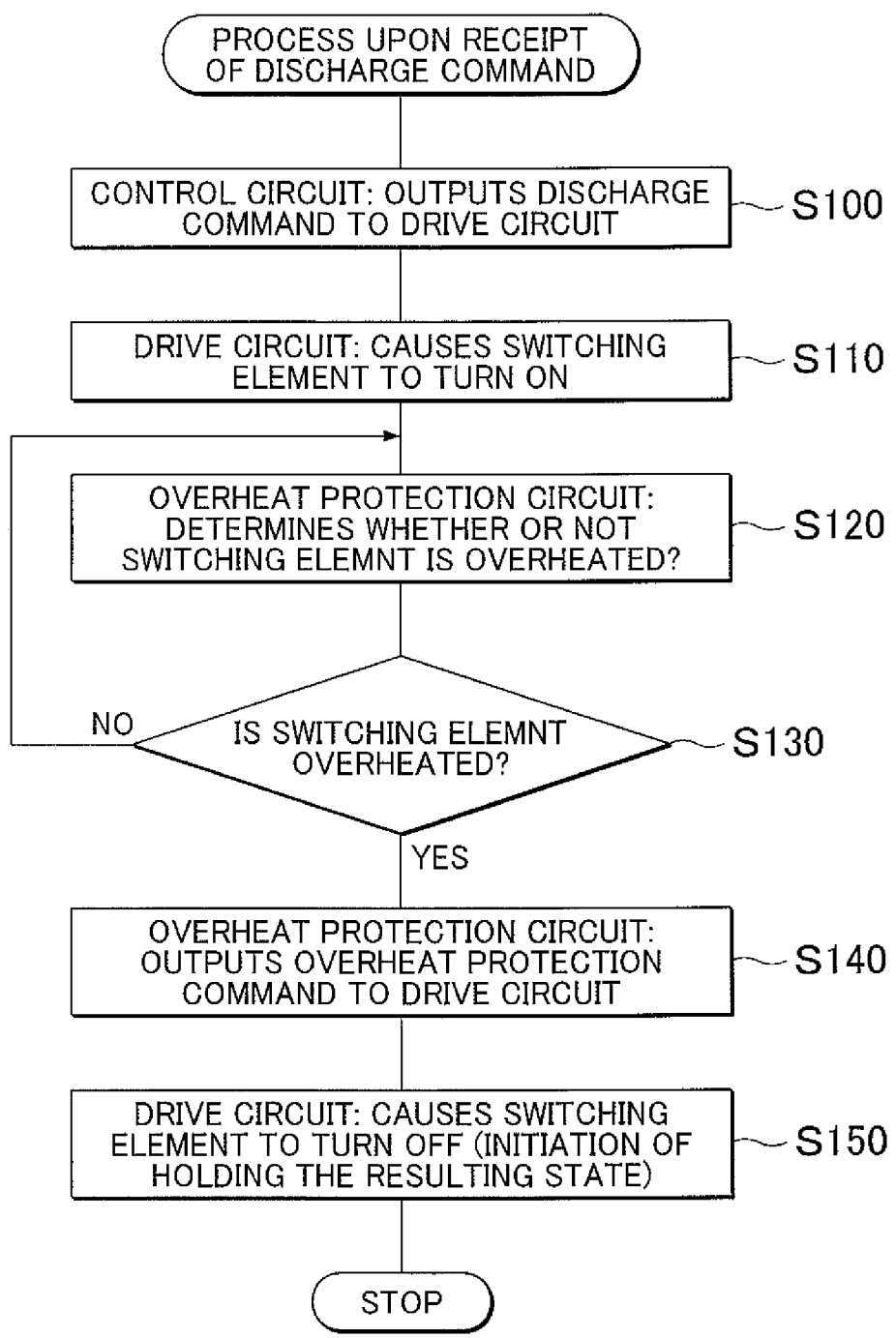
FIG. 3 is an example flowchart of a process that is executed upon receipt of a discharge command by the discharge device 60 of the embodiment.

Next, operations of the hybrid automotive vehicle 20 of the embodiment which is thus constructed will be described, the process including, especially, how the discharge device 60 operates upon receipt of the discharge command from the motor ECU 40 and a diagnostic process of the discharge device 60 caused by the motor ECU 40. Hereinbelow, first of all, an explanation is made as to how the discharge device 60 operates upon receipt of the discharge command from the motor ECU 40 and thereafter an explanation is made regarding the diagnostic process of the discharge device 60 caused by the motor ECU 40. FIG. 3 is an example flowchart of a process that is executed by the discharge device 60 of the embodiment upon receipt of the discharge command. This routine is initiated to execute when the control circuit 64 of the discharge device 60 receives the discharge command from the motor ECU 40.

It is to be noted that the motor ECU 40 feeds, upon establishment of the specified condition (discharge command condition) that includes the diagnostic condition of the discharge device 60, the discharge command to the control circuit 64. Here, for example, when the ignition switch 80 is turned off, it is possible to regard the resulting state as an establishment of the diagnostic condition and, for example, when the system main relay 56 is turned off resulted from a detection or prediction of a vehicle collision, it is possible to regard the resulting state as an establishment of the specified condition other than the diagnostic condition. In the embodiment, when the ignition switch 80 is turned off, the HVECU 70 judges an establishment of the diagnostic condition and feds the discharge command to the motor ECU 40, and then the motor ECU 40 sends the discharge command received to the control circuit 64. When a collision detection device and a collision prediction device (both are not shown) detects and predicts a vehicle collision, respectively, these devices send signals which indicate the vehicle collision detection and the vehicle collision prediction to the HVECU 70. Then, the HVECU 70 which receives the signals, understands an establishment of the specified condition other than the diagnostic condition, turns off the system main relay 56, and feeds a discharge command to the motor ECU 40 for discharge of the capacitor 58. This discharge command is then sent from the motor ECU 40 to the control circuit 64.

In a processing routine upon receipt of the discharge command, first of all, the control circuit 64 sends the discharge command received from the motor ECU 40 to the drive circuit 63 (Step S100) and the drive circuit 63 which receives this command causes the switching element 62 to turn on (Step S110). Thereby, if the system main relay 56 remains turned off due to the fact that a vehicle collision is detected and/or predicted, the capacitor 58 can be discharged.

Thus, when the switching element 62 is turned on, the overheat protection circuit 66 to determine, by using the signal from the thermistor 65, whether the switching element 62 is overheated or not (Steps S120 and S130). If the switching element 62 is not overheated, the control returns to Step S120, while if the switching element 62 is found to be overheated, the overheat protection circuit 66 issues the overheat protection command (the OFF command that indicates to turn off the switching element 62) to the drive circuit 63 (Step S140). The drive circuit 63 that receives this command causes the switching element 62 to turn off and begins to hold the resulting state of the switching element 62 (Step S150). Thereafter, this routine is terminated. After such a termination of this routine, the drive circuit 63 causes the switching element 62 to remain in the turned-off state until the system is brought into termination, regardless of whether the discharge command is outputted from the motor ECU 40 to the control circuit 64 or from the control circuit 64 to the drive circuit 63. In addition, in the embodiment, values of the resistor 61 and other factors are selected in order that the discharge device 60 is of a design degree at which the overheat protection circuit 66 fails to operate until the value of the charge of the capacitor 58 comes to 0 (i.e., until the termination of the discharge) in case of the discharge of the capacitor 58 while the system main relay 56 is being turned off.

Though the discharge command is not fed from the motor ECU 40, via the control circuit 64, to the drive circuit 63 during the normal travelling, if noise is mixed in the connection line (signal line) between the motor ECU 40 and the control circuit 64, or the control circuit 64 is brought into malfunction, the discharge signal may be fed to the drive circuit 63. On the other hand, in the embodiment, the drive circuit 63 causes the switching element 62 to turn on upon receipt of the discharge command from the control circuit 64. Thereafter, when the overheat protection circuit 66 begins to operate (i.e., upon receipt of the overheat protection command from the overheat protection circuit 66), the drive circuit 63 causes the switching element 62 to turn off and keeps the resulting state. Thereby, during the normal travelling, for example, if the drive circuit 63 continues to receive the discharge command from the motor ECU 40, it is possible to avoid repeatedly turning on and off the switching element 62, such a repetition being resulted from that the switching element 62 is turned on by the discharge command, the overheat protection circuit 66 operates to cause the switching element 62 to turn off, and the release of the operation of the overheat protection circuit 66 causes the switching element 62 to turn on, again.

Figure 4:
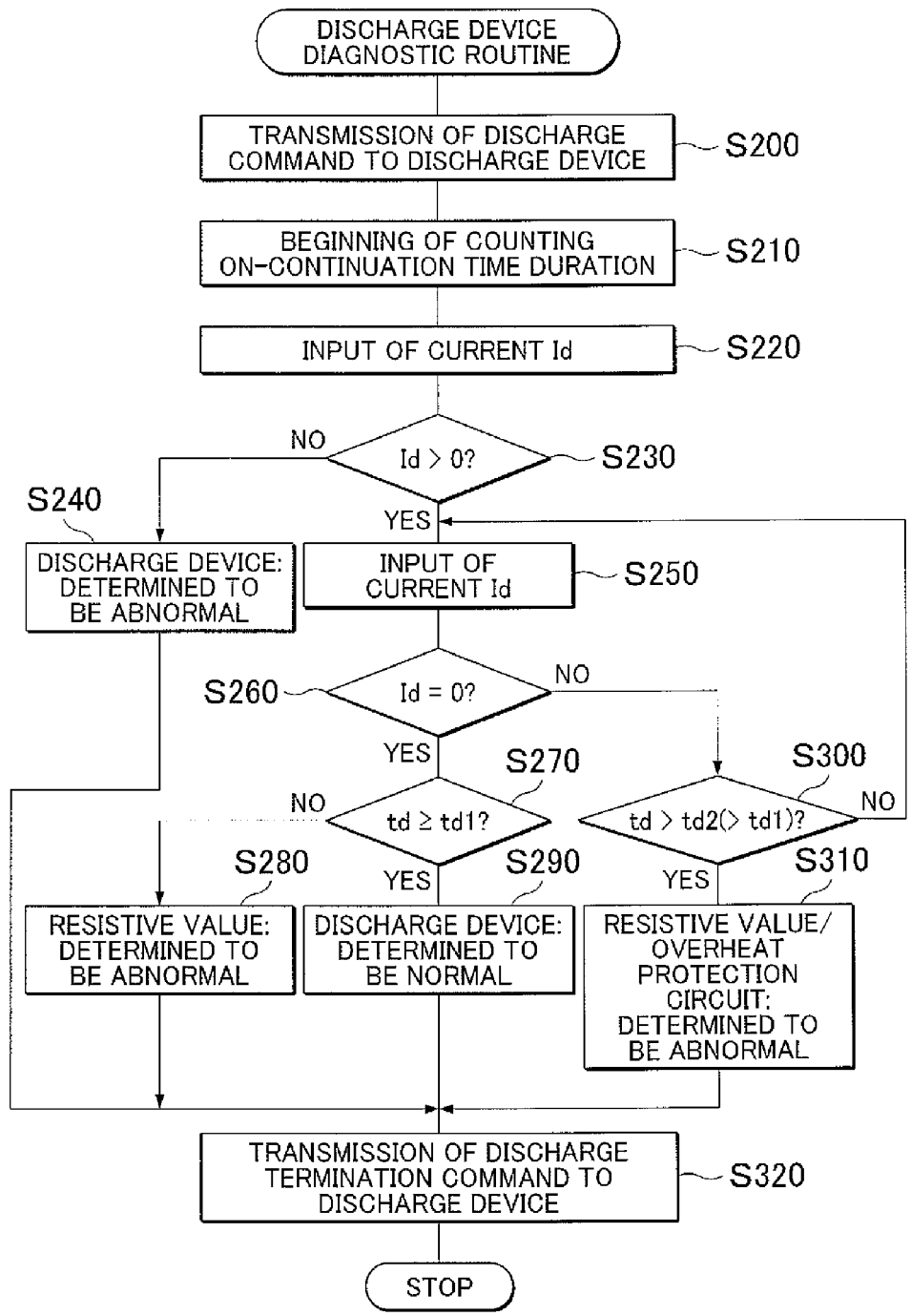
FIG. 4 is an example flowchart of a charge device diagnostic routine that is executed by a motor ECU 40 of the embodiment.

Next, the diagnostic process of the discharge device 60 that is performed by the motor ECU 40 will be described. FIG. 4 is an example flowchart that illustrates a discharge device diagnostic routine that is executed by a motor ECU 40 of the embodiment. This routine is executed upon establishment of the diagnostic condition. It is to be noted that while this routine is in execution, the system main relay 56 is being turned on.

In the discharge device diagnostic routine, the motor ECU 40, at first, sends the discharge command to the control circuit 64 of the discharge device 60 (Step S200). The control circuit 64 that receives the discharge command outputs this command to the drive circuit 63. The drive circuit 63 that receives this command, in principle, causes the switching element 62 to turn on, but if the switching element 62 is being held in the turned off state, the drive circuit 63 continues to hold this state of the switching element 62.

Next, counting the ON-continuation time duration td is started that indicates a time duration during which a current flows through the discharge resistor 61 and the switching element 62 (Step S210), the current Id is inputted from the current sensor 69 (Step S220), and it is determined whether or not the value of the conduction current Id is larger than 0 (Step S230). The process of this Step 230 is for determining whether or not the switching element 62 is turned on or off (i.e., whether or not currents flow through the discharge resistor 61 and the switching element 62).

If the value of the conduction current Id is zero (0), the switching element 62 is judged to be turned off (due to the fact that no current flows through the discharge resistor 61 and the switching element 62), thereby determining that the discharge device 60 is abnormal (Step S240). Thus, the operation of the discharge device 60 prior to the execution of this routine (prior to the establishment of the diagnostic condition) can results in that the discharge device 60 is abnormal. As to why the switching element 62 cannot be turned on, other than the operation of the discharge device 60 prior to the execution of this routine, for example, one possible reason is that the discharge device 60 will not operate (due to that the switching element 62 that remains tuned off is in malfunction).

And, the discharge termination command is fed to the control circuit 64 of the discharge device 60 (Step S320) and this routine is terminated. Now, since the current discussion is made on the assumption that the switching element 62 is being turned off, if the discharge termination command is fed from the motor ECU 40, via the control circuit 64, to the drive circuit 63 that receives this command causes the switching element 62 to keep its turned-off state. When this routine is terminated in such a way, the motor ECU 40 feeds the diagnostic termination signal that indicates a termination of the diagnosis of the discharge device 60 to the HVECU 70, and the HVECU 70 that receives this command causes the system main relay 56 to turn off. And due to the fact that the switching element 62 is being held at its turned-off state, for discharging the capacitor 58, the motor ECU 40 causes the switching elements of the respective inverters 41 and 42 to be under switching control for the prevention of torque output from the motors MG1 and MG2 (for enabling d-axis current to flow). After completion of discharging the capacitor 58, the system is terminated.

In Step S230, the value of the conduct current Id is found not to be zero (0), it is determined that a current flows through the discharge resistor 61 and the switching element 62, the current Id from the current sensor 69 is inputted (Step 250) to determine whether or not the value of the conduct current Id is zero (0) or not (Step S260). On the basis of the process in Step S200 (the process of feeding the discharge command to the control circuit 64), when the drive circuit 63 causes the switching element 62 to turn on, a current flows through the discharge resistor 61 and the switching element 62, thereby increasing the temperature of the discharge resistor 61. And, when the discharge resistor 61 becomes overheated, the overheat protection circuit 66 begins to operate, and the drive circuit 63 causes the switching element 62 to turn off, thereby not causing the current to flow through the discharge resistor 61. In brief, the process of Step S260 is to determine whether no current flows through the discharge resistor 61 because the switching element 62 is caused to turn off.

In Step 260, if the value of the conduct current Id is found not to be zero (0), a current flowing through the discharge resistor 61 is determined, and the ON-continuation time duration td is compared to a threshold value td2 (Step S300). If the ON-continuation time duration td is equal to or less than the threshold value td2, the system returns to Step S250. Here, the threshold value td2 is defined as a maximum time duration during which the switching element 62 is being turned off when the discharge device 60 is in the normal condition, and is calculated, by, for example, previous experimental and analytical methods. As the threshold value td2, for example, 5 seconds or 6 seconds is available.

During the executions of processes of Steps S250, S260, and S300 in a repeated manner, if the value of the conduct current Id is determined to be zero (0) in Step 260, no current flowing through the discharge resistor 61 is determined, and the ON-continuation time duration td is compared to a threshold value td1 that is smaller than the threshold value td2 (S270). If the ON-continuation time duration td is equal to or more than the threshold value td1 (If the ON-continuation time duration td is equal to or more than the threshold value td1 and is equal to or less than the threshold value td2), the discharge device 60 is determined to be normal (Step S290). If the ON-continuation time duration td is less than the threshold value td1, the resistive value of the discharge resistor 61 of the discharge device 60 is determined to be abnormal (The high resistive value of the discharge resistor 61 causes the heating amount thereof to increase to a higher value, which shorten the time required for bringing the switching element 62 into the turned off state) (Step 280). Then, the discharge termination command is fed to the control circuit 64 of the discharge device 60 (Step S320) and this routine is terminated. Here, when the discharge device 60 is in the normal condition, the threshold value td1 is defined as a minimum time duration during which the switching element 62 is being turned off and is calculated, by previous experimental and analytical methods. As the threshold value td2, for example, 3 seconds or 4 seconds may be available.

During the executions of processes of Steps S250, S260, and S300 in a repeated manner, if the ON-continuation time duration td is judged to be more than the threshold value td2 in Step 300, the resistive value of the discharge resistor 61 of the discharge device 60 is abnormal (The low resistive value of the discharge resistor 61 causes the heating amount thereof to decrease to a lower value, which lengthen the time required for bringing the switching element 62 into the turned off state) or the overheat protection circuit 66 is abnormal (Upon overheat of the discharge resistor 61, the overheat protection circuit 66 fails to output the OFF-command to the drive circuit 63 that indicates to turn off the switching element 62) (Step S310), the discharge termination command is transmitted to the control circuit 64 of the discharge device 60 (Step S320), and this routine is terminated.

In the embodiment, on the basis of the time duration between the time instant at which the switching element 62 is turned on and the later time instant at which the switching element 62 is turned off upon receipt of the OFF-command from the overheat protection circuit 66 for turning off the switching element 62 (on the basis of the ON-continuation time, duration), the drive circuit 63 determines a normal condition under which the discharge device 60 is normal, a first abnormal condition under which the resistive value of discharge resistor 61 is abnormal, and a second abnormal condition under which the resistive value of the discharge resistor 61 or the overheat protection circuit 66 is abnormal, thereby allowing the discharge device 60 to diagnose more properly.

In accordance with the above described hybrid automotive vehicle 20 of the embodiment, the drive circuit 63 of the discharge device 60 receives the discharge command from the motor ECU 40 via the control circuit 64 which is followed to cause the switching element 62 to turn on, thereafter, the drive circuit 63, upon receipt of the overheat protection command from the overheat protection circuit 66, causes the switching element 62 to turn off and holds the resulting state of the switching element 62, and the motor ECU 40 determines that the discharge device 60 is abnormal when no current flows through the discharge resistor 61 and the switching element 62 by transmitting the discharge command to the control circuit 64 of the discharge device 60 upon establishment of the diagnostic condition, thereby making it possible to determine that the discharge device 60 is abnormal when the discharge device 60 begins to operate before the diagnostic condition is established. In addition, at this time, after the drive circuit 63 causes the switching element 62 to turn off by receiving the overheat protection command from the overheat protection circuit 66, it is possible to avoid repeating turned-on and turned-off states of the switching elements 62.

In accordance with the hybrid automotive vehicle 20 of the embodiment, after establishment of the diagnostic condition and the subsequent transmission of the discharge command to the control circuit 64 of the discharge device 60 by the motor ECU 40, the ON-continuation time duration td, which elapses from an initiation of the current flow through the discharge resistor 61 and the switching element 62 that is caused by the discharge command until a termination of this current flow, determines the normal condition under which the discharge device 60 is normal, the first abnormal condition under which the resistive value of discharge resistor 61 is abnormal, and the second abnormal condition under which the resistive value of the discharge resistor 61 or the overheat protection circuit 66 is abnormal, thereby enabling the diagnose of the discharge device more properly.

In the hybrid automotive vehicle 20 of the embodiment, when the motor ECU 40 transmits the discharge command to the control circuit 64 of the discharge device 60 in response to the establishment of the diagnostic condition, the discharge device 60 is determined to be abnormal if no current flows through the discharge resistor 61 and the switching element 62, while if the current flows through the discharge resistor 61 and the switching element 62, the determination using the ON-continuation time duration td that indicates no current flow is the normal condition under which the discharge device 60 is normal, the first abnormal condition under which the resistive value of discharge resistor 61 is abnormal, or the second abnormal condition under which the resistive value of the discharge resistor 61 or the overheat protection circuit 66 is abnormal. However, instead, it is possible to determine that the discharge device 60 is normal when a current flows through the discharge resistor 61 and the switching element 62.

In the hybrid automotive vehicle 20 of the embodiment, when the drive circuit 63 causes the switching element 62 to turn on after receipt of the discharge command from the motor ECU 40 via the control circuit 64, and when the drive circuit 63 causes the switching element 62 to turn off by receiving the overheat protection command from the overheat protection circuit 66, the resulting state of the switching element 62 is being held and when the motor ECU 40 transmits the discharge command to the control circuit 64 of the discharge device 60 in response to the establishment of the diagnostic condition, the discharge device 60 is determined to be abnormal if no current flows through the discharge resistor 61 and the switching element 62, while if the current flows through the discharge resistor 61 and the switching element 62, the condition (normal, the first abnormal, or the second abnormal) of the discharge device 60 is determined by using the ON-continuation time duration td that indicates no current flow. Instead, when the motor ECU 40 performs such a process for diagnosing the discharge device 60, the drive circuit 63 may operate in another way in which the drive circuit 63, after causing the switching element 62 to turn on upon receipt of the discharge command from the motor ECU 40 via the control circuit 64, causes the switching element 62 to turn off upon receipt of the overheat protection command from the overheat protection circuit 66, and thereafter, upon receipt of the discharge command from the motor ECU 40 via the control circuit 64, causes the switching element 62 to turn on again. In such a case, when the motor ECU 40 feeds the discharge command to the control circuit 64 of the discharge device 60 in response to the diagnostic condition, the switching element 62 is caused to turn on by the drive circuit 63, which means that an operation (malfunction) of the discharge device 60 cannot be recorded (the switching element 62 is not held to turn off) prior to an establishment of the diagnostic condition, resulting in that on this ground it cannot determine that the discharge device 60 is abnormal. However, similar to the embodiment, it is possible to determine the condition (normal, the first abnormal, or the second abnormal) of the discharge device 60 by using the ON-continuation time duration td that indicates no current flow.

In the hybrid automotive vehicle 20 of the embodiment, after establishment of the diagnostic condition and the subsequent transmission of the discharge command to the control circuit 64 of the discharge device 60 by the motor ECU 40, the ON-continuation time duration td, which elapses from the initiation of the current flow through the discharge resistor 61 and the switching element 62 that is caused by the discharge command until the termination of this current flow, determines the normal condition under which the discharge device 60 is normal, the first abnormal condition under which the resistive value of discharge resistor 61 is abnormal, and the second abnormal condition under which the resistive value of the discharge resistor 61 or the overheat protection circuit 66 is abnormal. However, instead, it may modify the ON-continuation time duration td to determine that the discharge device 60 is either in the normal condition or the first abnormal condition, or to determine that the discharge device 60 is either in the normal condition or the second abnormal condition. In addition, the ON-continuation time duration td may be modified to determine merely whether the discharge device 60 is normal or abnormal.

In the hybrid automotive vehicle 20 of the embodiment, for determining whether the switching element 62 is turned on (i.e., whether the current flows through the discharge resistor 61 and the switching element 62), the current Id fed from the current sensor 69 is used. Instead, a current signal may be used that comes from a current sensor provided in the positive electrode bus 54a of the power line 54 or a voltage signal may be used that comes from a voltage sensor provided across the discharge resistor 61 or the switching element 62.

In the hybrid automotive vehicle 20 of the embodiment, the threshold values td1 and td2, that are used for determining whether the discharge device 60 is in the normal condition, the first abnormal condition, or the second normal condition, are previously calculated values, respectively (for example, the threshold value td1 is 3 or 4 seconds, while the threshold value td2 is 5 or 6 seconds) by, for example, experimental or analytical method. However, since it is supposable that the time required for the overheat protection circuit 66 to function (ON-continuation time duration td) varies depending on an initial temperature of the discharge resistor 61 (the temperature last minute causing the switching element 62 to turn on), a method may be employed here when the initial temperature of the discharge resistor 61 is identified, the corresponding threshold value td1 and threshold value td2 are selected from a map, the map being prepared, by, for example, experimental or analytical method, to store therein a relationship between initial temperatures of the discharge resistor 61, threshold values td1, and threshold values td2. In this case, the threshold values td1 and td2 may be set smaller as the initial temperature of the discharge resistor 61 becomes higher.

Figure 5:
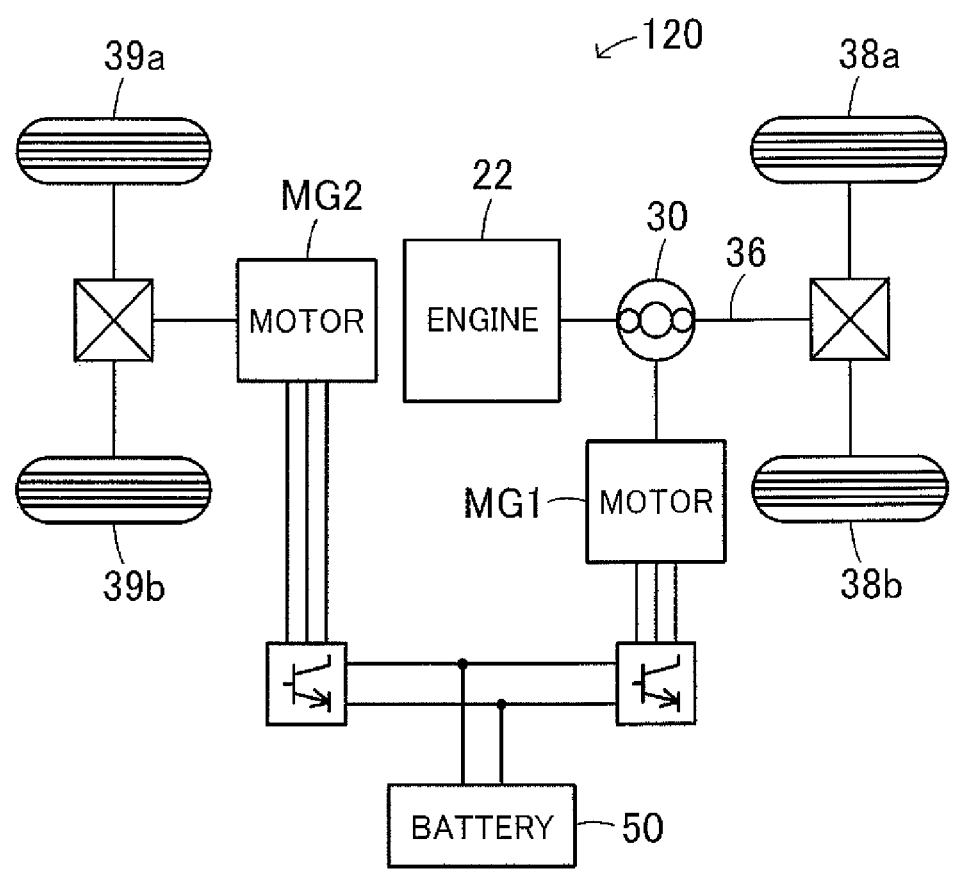
FIG. 5 is a schematic block diagram of an outline structure of a hybrid automotive vehicle 120 according to a modification.

In the hybrid automotive vehicle 20 of the embodiment, although the power that is delivered from the motor MG2 is outputted to the drive shaft 36 to which the driving wheels 38a and 38b are connected, as exemplary illustrated in a hybrid automotive vehicle 120 according to a modified example that is shown in FIG. 5, the power delivered from the motor MG2 may be outputted to an axle (in FIG. 5, an axle to which the wheels 39a and 39b are connected) that is different from the axle to which the drive shaft 36 is connected (the axle connected to the driving wheels 38a and 38b).

Figure 6:
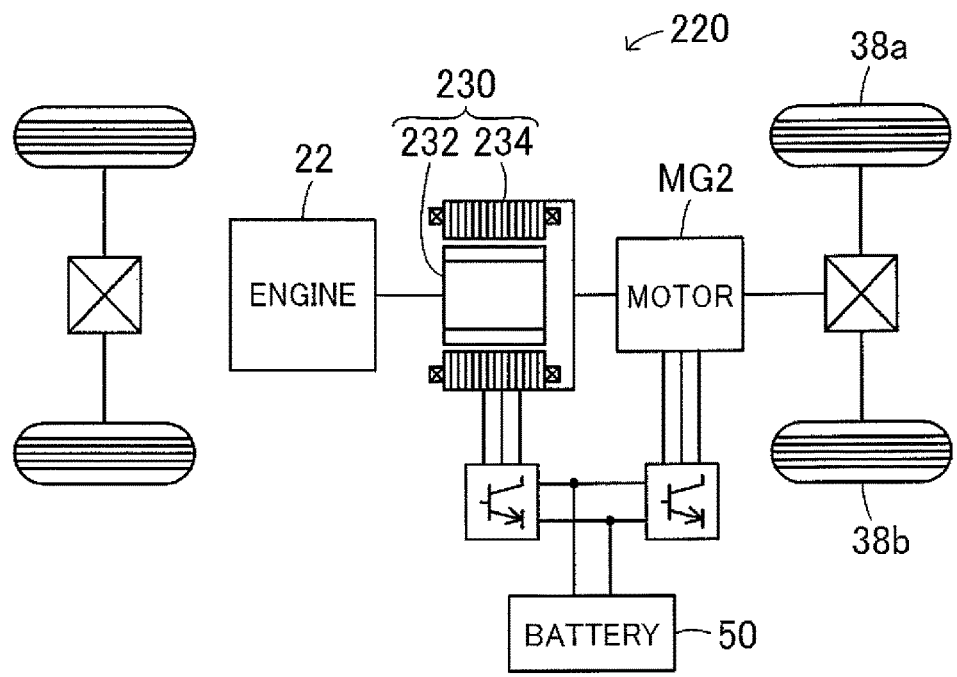
FIG. 6 is a schematic block diagram of an outline structure of a hybrid automotive vehicle 220 according to a modification.

In the hybrid automotive vehicle 20 of the embodiment, although the mechanical power that is delivered from the engine 22 is outputted, via the planetary gear 30, to the drive shaft 36 to which the driving wheels 38a and 38b are connected, as exemplary illustrated in a hybrid automotive vehicle 220 according to a modified example that is shown in FIG. 6, a dual rotor motor 230 may be provided that has an inner rotor 232 connected to the crankshaft of the engine 22 and an outer rotor 234 connected to the drive shaft 36 to which the driving wheels 38a and 38b are connected, the dual rotor motor 230 being configured to deliver some of the mechanical power from the engine 22 to the drive shaft 36 and to convert the remaining power into electric power.

Figure 7:
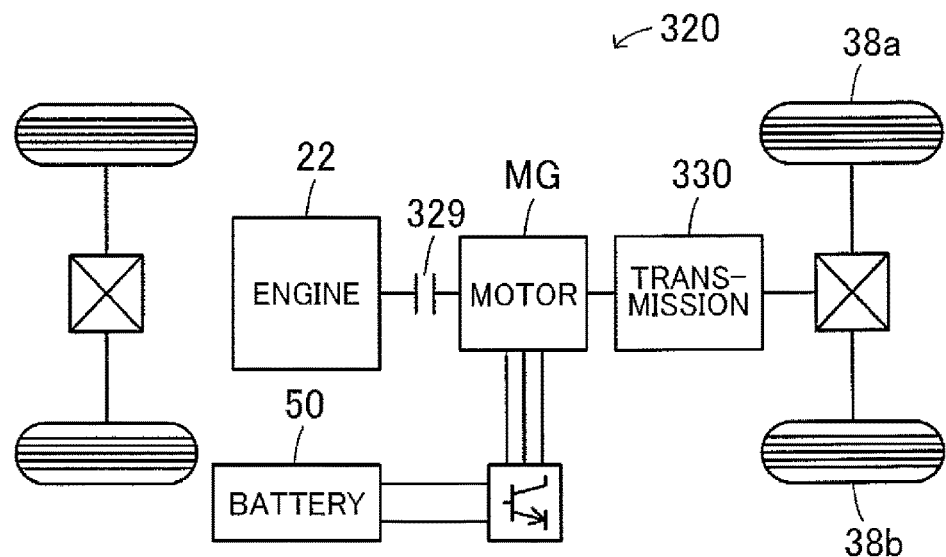
FIG. 7 is a schematic block diagram of an outline structure of a hybrid automotive vehicle 320 according to a modification.
Figure 8:
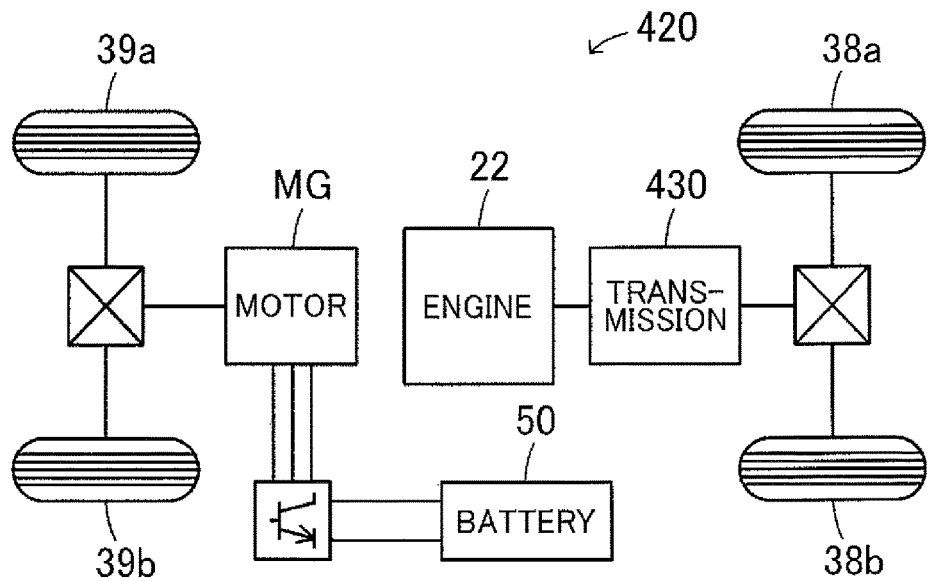
FIG. 8 is a schematic block diagram of an outline structure of a hybrid automotive vehicle 420 according to a modification.

In the hybrid automotive vehicle 20 of the embodiment, although the mechanical power that is delivered from the engine 22 is outputted, via the planetary gear 30, to the drive shaft 36 to which the driving wheels 38a and 38b are connected and the mechanical power that is delivered from the motor MG2 is outputted to the drive shaft 36, as exemplary illustrated in a hybrid automotive vehicle 320 according to a modified example that is shown in FIG. 7, a configuration may be employed in which a motor MG is connected, via a transmission 330, to the drive shaft 36 to which the driving wheels 38a and 38b are connected and a rotation shaft of the motor MG is connected, via a clutch 329, to the engine 22, thereby outputting the mechanical power from the engine 22, via the rotation shaft of the motor MG and the transmission 330, to the drive shaft 36 and outputting the mechanical power from the motor MG, via the transmission 330, to the drive shaft 36. Otherwise, as exemplary illustrated in a hybrid automotive vehicle 420 according to a modified example that is shown in FIG. 8, a configuration may be employed in which the mechanical power delivered from the engine 22 is outputted, via a transmission 430, to the drive shaft 36 to which the driving wheels 38a and 38b are connected and the mechanical power delivered from the motor MG is outputted to an axle (corresponding to an axle to which the wheels 39a and 39b are connected in FIG. 8) that is different from the axle to which the driving wheels 38a and 38b are connected.

Figure 9:
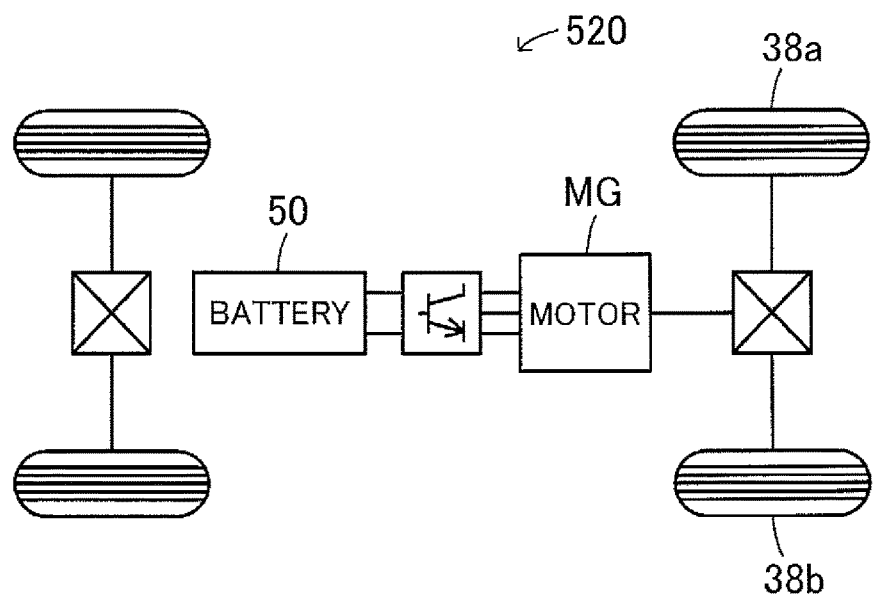
FIG. 9 is a schematic block diagram of an outline structure of an electric automotive vehicle 520 according to a modification.

Although the embodiment is described such that the present invention is applied to the hybrid automotive vehicle 20 that is provided with the engine 22 for travelling and the motor MG2, as exemplary illustrated in an electric automotive vehicle 520 according to a modified example that is shown in FIG. 9, the present invention is applicable to the electric automotive vehicle 520, which is not provided with an engine and can travel by using only the mechanical power from the motor MG.

An explanation is made as to correspondence between the principal elements of the embodiments and the principal elements of the invention described in the section titled "SUMMARY OF THE INVENTION(S)". As to the relationship between the embodiments and the first and second automotive vehicle of the present invention, in common, the motor MG2 corresponds to "motor", the battery 50 corresponds to "battery", the discharge device 60 corresponds to "discharge device", the discharge device 60 including the discharge resistor 61, the switching element the 62, the drive circuit 63, the control circuit 64, the thermistor 65, the overheat protection circuit 66, and the power supply circuit 67, and the motor ECU 40 that executes the discharge device diagnostic routine shown in FIG. 4 corresponds to "motor control device".

Here, the "motor" of each of the first and second automotive vehicles according to the present invention is not limited to the motor MG2 that is configured as, a synchronous generator and may be in the form of any motor for driving such as an induction generator. The "battery" of each of the first and second automotive vehicles according to the present invention is not limited to the battery 50 that is configured as a lithium secondary battery and may be in the form of any battery such as nickel-hydrogen and nickel-cadmium secondary batteries and a lead storage battery.

The "discharge device" of the first automotive vehicle according to the present invention is not limited to the discharge device 60 that includes the discharge resistor 61, the switching element the 62, the drive circuit 63, the control circuit 64, the thermistor 65, the overheat protection circuit 66, and the power supply circuit 67. The "discharge device" of the first automotive vehicle according to the present invention may be in the form of any device that includes a discharge portion having a discharge resistor and a switching element connected in series between positive and negative electrode buses of a power line for connection between an inverter that drives the motor and a battery, and a drive circuit that causes the switching element to turn selectively on and off, and an overheat protection portion that outputs the OFF-command for causing the switching element to turn off while determining an overheat of the discharge resistor, in which after the discharge portion causes the switching element to turn on upon receipt of the ON-command from the motor control device that indicates to turn on the switching element, the discharge portion causes the switching element to turn off in response to the OFF-command received that indicates to turn off the switching element from the overheat protection portion and thereafter holds the resulting state of the switching element regardless of a signal from the motor control device. The "motor control device" of the first automotive vehicle according to the present invention is not limited to the motor ECU 40. The "motor control device" may be in the form of any device which controls the motor, which outputs the ON-command that indicates to turn on the switching element to the discharge portion upon establishment of the specified condition including the diagnostic condition of the discharge device, which outputs the ON-command that indicates to turn on the switching element to the discharge portion upon establishment of the diagnostic condition, and which determines whether the discharge device is normal or abnormal based on whether or not a current flows through the discharge resistor.

The "discharge device" of the second automotive vehicle according to the present invention is not limited to the discharge device 60 that includes the discharge resistor 61, the switching element the 62, the drive circuit 63, the control circuit 64, the thermistor 65, the overheat protection circuit 66, and the power supply circuit 67. The "discharge device" of the second automotive vehicle according to the present invention may be in the form of any device that includes a discharge portion having a discharge resistor and a switching element connected in series between positive and negative electrode buses of a power line for connection between an inverter that drives the motor and a battery, and a drive circuit that causes the switching element to turn selectively on and off, and an overheat protection portion that outputs the OFF-command for causing the switching element to turn off while determining an overheat of the discharge resistor, in which after the discharge portion causes the switching element to turn on upon receipt of the ON-command from the motor control device that indicates to turn on the switching element, the discharge portion causes the switching element to turn off in response to the OFF-command received that indicates to turn off the switching element from the overheat protection portion. The "motor control device" is not limited to the motor ECU 40. The "motor control device" may be in the form of any device which controls the motor, which outputs the ON-command that indicates to turn on the switching element to the discharge portion upon establishment of the specified condition including the diagnostic condition of the discharge device, which outputs the ON-command that indicates to turn on the switching element to the discharge portion upon establishment of the diagnostic condition, and which determines whether the discharge device is normal or abnormal based on the ON-continuation time duration until the switching element is turned off which is caused by the discharge portion upon receipt of the OFF command that indicates to turn off the switching element from the overheat protection portion.

For greater certainty, as to the correspondence between the principal elements of the embodiments and the principal elements of the invention described in the section titled "SUMMARY OF THE INVENTIONS)", the principal elements of the invention are, by no means, not limited to the principal elements of the embodiment due to the fact that each of the embodiments is one of the ways to carry out the present invention. In other words, the understanding or interpretation of the invention described in the section titled "SUMMARY OF THE INVENTION(S)" should be made based on the description thereof and the embodiments are mere examples of the invention described in the section titled "SUMMARY OF THE INVENTION(S)".

In the above, although the modes for carrying out the present invention are described in term of the embodiments, it is to be understood that the present invention is not limited to these embodiments and is susceptible of various changes and modifications without departing from the spirit and scope of the claimed invention.

The present invention is applicable in, for example, the automobile industry.

What is claimed is:

1. An automotive vehicle comprising:
    a motor for travelling;
    a battery;
    an inverter driving the motor;
    a discharge device including
        a discharge portion including
            a discharge resistor and a switching element connected in series to positive electrode bus and negative electrode bus of a power line that connects the inverter and the battery,
            a driving circuit causing the switching element to turn selectively on and off, and
            an overheat protection portion outputting an OFF command to the discharge portion for turning off the switching element while determining an overheat condition of the discharge resistor; and
    a motor control device controlling the motor and outputting an ON command to the discharge portion that indicates to turn on the switching element when a specified condition is established that includes a diagnostic condition of the discharge device,
    the discharge portion being configured to, after turning on the switching element by receiving the ON command that indicates to turn on the switching element from the motor control device and subsequently turning off the switching element by receiving the OFF command that indicates to turn off the switching element from the overheat protection portion, cause the switching element to remain turned off regardless of the command from the motor control device,
    the motor control device being configured to output the ON command that indicates to turn on the switching element to the discharge portion and to determine whether the discharge device is normal or abnormal based on whether a current flows or not through the discharge resistor when the diagnostic condition is established,
    wherein the motor control device is a device that determines whether the discharge device is normal or abnormal based on an ON-continuation time duration between a time instant when the electric current flows through the discharge resistor which is caused by outputting the ON command that indicates to turn on the switching element after establishment of the diagnostic condition and a time instant when the discharge portion causes the switching element to turn off by the OFF command that indicates to turn off the switching element from the overheat protection portion.

2. The automotive vehicle according to claim 1, wherein the motor control device is configured to determine that the discharge deice is normal when the ON-continuation time duration is equal to or longer than a first predetermined time duration and is equal to or shorter than a second predetermined time duration that is longer than the first predetermined time duration, to determine that a resistive value of the discharge resistor of the discharge device is abnormal when the ON-continuation time duration is less than the first predetermined time duration, and to determine that the discharge resistor or the overheat protection portion of the discharge device is abnormal when the ON-continuation time duration is longer than the second predetermined time duration.

3. An automotive vehicle comprising:
   a motor for travelling;
   a battery;
   an inverter driving the motor;
   a discharge device including
      a discharge portion including
         a discharge resistor and a switching element connected in series to positive electrode bus and negative electrode bus of a power line that connects the inverter and the battery,
         a driving circuit causing the switching element to turn selectively on and off, and
         an overheat protection portion outputting an OFF command to the discharge portion that indicates to turn off the switching element upon receipt of a determination of an overheat condition of the discharge resistor in continuous fashion until the overheat condition is determined to be eliminated; and
   a motor control device controlling the motor and outputting an ON command to the discharge portion that indicates to turn on the switching element when a specified condition is established that includes a diagnostic condition of the discharge device,
   the discharge portion being configured to turn on the switching element upon receipt of the ON command that indicates to turn on the switching element from the motor control device and subsequently to turn off the switching element upon receipt of the OFF command that indicates to turn off the switching element from the overheat protection portion,
   the motor control device being configured to determine whether the discharge device is normal or abnormal based on an ON-continuation time duration between a time instant when the ON command that indicates to turn on the switching element is outputted to the discharge portion after establishment of the diagnostic condition and a time instant when the discharge portion causes the switching element to turn off by the OFF command from the overheat protection portion that indicates to turn off the switching element.

4. The automotive vehicle according to claim 3, wherein the motor control device is configured to determine that the discharge device is normal when the ON-continuation time duration is equal to or longer than a first predetermined time duration and is equal to or shorter than a second predetermined time duration that is longer than the first predetermined time duration, to determine that a resistive value of the discharge resistor of the discharge device is abnormal when the ON-continuation time duration is less than the first predetermined time duration, and to determine that the discharge resistor or the overheat protection portion of the discharge device is abnormal when the ON-continuation time duration is longer than the second predetermined time duration.

5. The automotive vehicle according to claim 1 further comprising:
   an engine;
   a generator; and
   a planetary gear whose three rotating elements are connected to a drive shaft connected to an axle, an output shaft of the engine, and a rotation shaft of the generator, respectively,
   wherein the motor is configured such that a rotor of the motor is connected to the drive shaft.

* * * * *